United States Patent Office
3,433,085
Patented Mar. 18, 1969

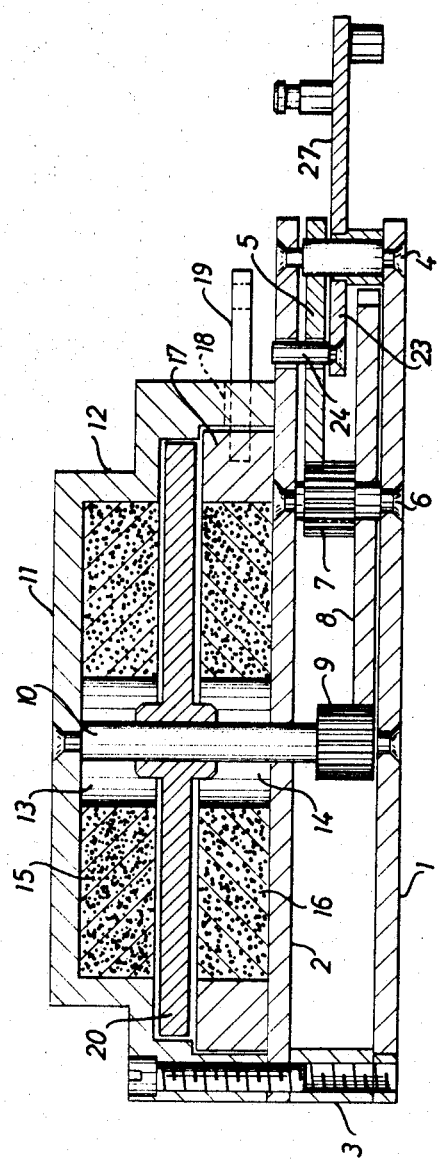

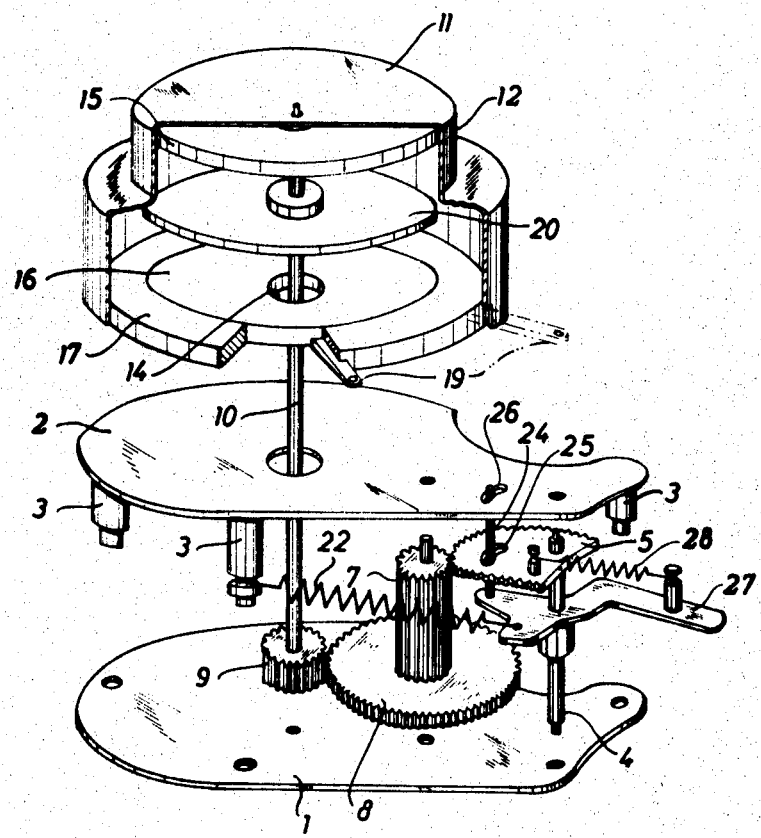

3,433,085
MECHANISMS FOR CAMERA SHUTTERS
Lennart G. O. Dahlgren, 61 Opalgatan,
Vastra Frolunda, Sweden
Filed Mar. 13, 1967, Ser. No. 622,610
Claims priority, application Sweden, Mar. 16, 1966,
3,455/66
U.S. Cl. 74—89.19           2 Claims
Int. Cl. F16h 29/00

ABSTRACT OF THE DISCLOSURE

A shutter delay control mechanism for a camera is provided which includes a nonmagnetic eddy current disc disposed in a variable magnetic field. The magnetic field is generated by two permanent magnets, one mounted on each side of the eddy current disc, and these may be disc shaped ferrite magnets mounted on shafts. The relative position of the permanent magnets is adjustable. The shutter delay time is adjustable according to the conditions to be met.

---

Figure 1:
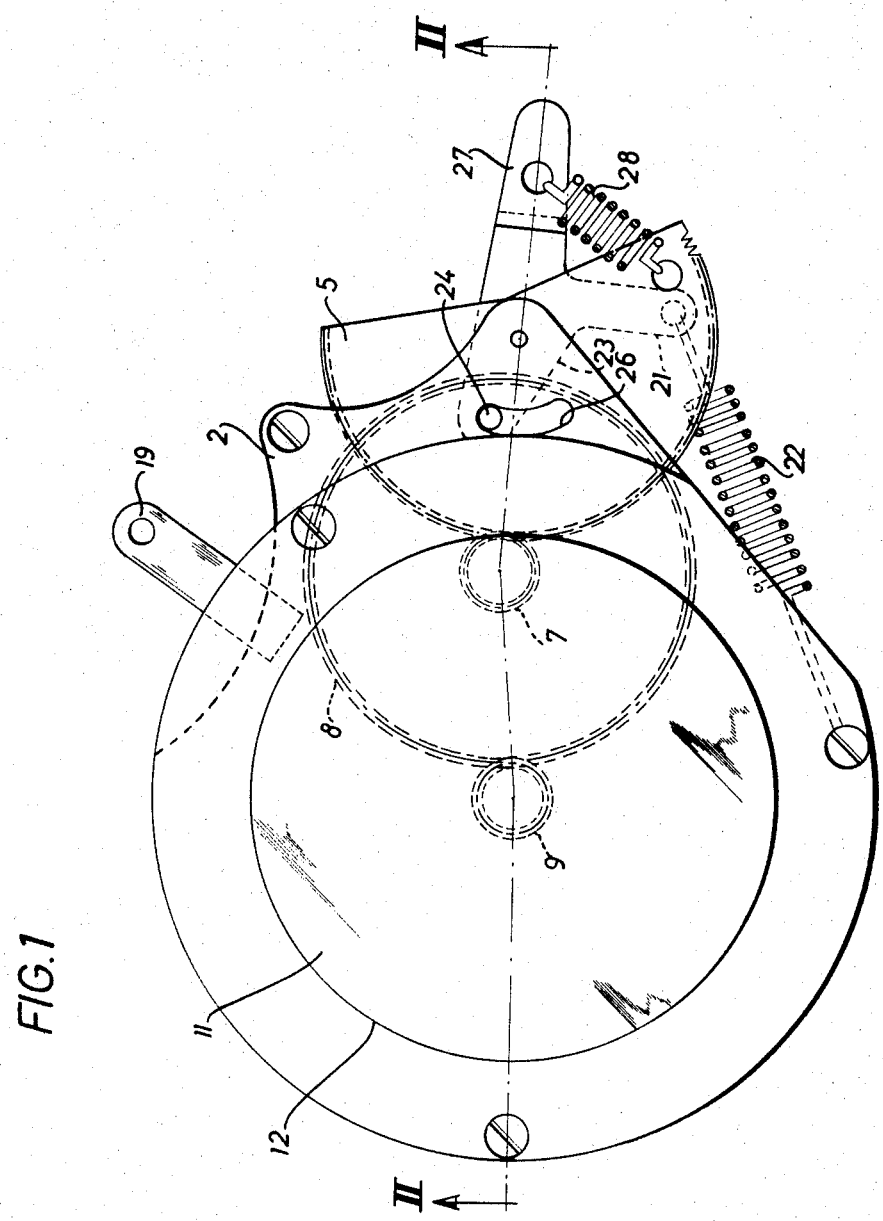

In such photographic cameras which may be set for exposure times exceeding one tenth of a second, the operation of the shutter during such longer exposure times is controlled by means of a delay mechanism comprising a rotatably journalled delay element which is driven by a spring-drive mechanism and which during rotation is acted on by an adjustable retarding or braking force the magnitude of which determines the exposure time. In hitherto known delay mechanisms of this kind, the braking is effected mechanically which necessitates a comparatively high-powered drive spring, especially in view of the initial friction which must be overcome when the delay element is started from standstill. These known devices are subject to considerable wear which causes the real exposure times to deviate from the setting times after the camera has been used for some time.

The present invention has for its object to overcome these inconveniences by providing a delay mechanism which has a very small starting resistance independent of the magnitude of the braking force applied.

According to the present invention, the delay element consists of a rotatable eddy current disc disposed in a variable magnetic field. Such a delay mechanism will operate practically without noise and will be subject to very slight wear in comparison with previously known devices.

The magnetic field may be generated by two permanent magnets arranegd one on each side of the disc and adjustable relative to one another. Such magnets may consist of disc-shaped ferrite magnets made with magnetic poles in the surfaces facing the eddy current disc, one of said disc-shaped magnets being rotatable coaxially with the eddy current disc relative to the other magnet between two end positions.

In one embodiment of the present invention the spring drive includes a toothed gear segment acted on by a stretchable spring and adapted to drive the delay element, said spring is connected to means pivotally journaled substantially coaxially with the toothed segment, said means transmitting the action of the spring to the toothed segment by the means of a single-way coupling member.

The present invention is more fully described herebelow with reference to the accompanying drawings wherein:

FIGURE 1 is an elevation from one side of a delay mechanism according to the present invention, FIGURE 2 is a longitudinal cross section taken on the line II—II in FIGURE 1, and FIGURE 3 is a diagrammatic perspective expanded view of the mechanism.

In the drawings, numerals 1 and 2 indicate two plates which are mounted spaced from one another in parallel relation and interconnected by means of screws and spacer sleeves indicated at 3 in FIGURE 3. A toothed gear segment 5 is mounted on a shaft 4 provided between the plates, 1 and 2, and rotatably journaled thereon, said segment 5 meshing with a gear wheel 7 which is fixedly carried by a second shaft 6 mounted between the plates 1 and 2. Gear wheel 7 rotates fixedly with a larger gear wheel 8 provided on the same shaft and which meshes with a third gear wheel 9 fixedly mounted on a shaft 10 parallel with shafts 4 and 6. The shaft 10 has one end rotatably journaled in the plate 1 and extends through an opening in the plate 2 and has its opposite end journaled rotatably in the terminal plate portion 11 of a cup-shaped casing 12 provided on that side of the plate 2 which faces away from the plate 1.

In the casing 12 there are provided two disc-shaped magnets 15 and 16 coaxial with the shaft 10 and provided with central openings 13 and 14, respectively, for the shaft 10. The disc magnet 15 is fixedly mounted in the casing adjacent the terminal plate portion 11 thereof, whereas the disc magnet 16 is mounted in a ring 17 surrounding the magnet 16 and mounted for angular displacement in the casing 12 adjacent the plate 2. Therefore disc magnet 16 may be rotated with reference to disc magnet 15. The ring 17 may be rotated through an angle by means of an arm 19 connected to the ring and projecting radially therefrom through a slot 18 in the casing 12. In the space between the disc magnets 15 and 16 there is mounted a metal disc 20 fixedly mounted on the shaft 10 and consisting of aluminum or other non-magnetic material with good electrical conductivity.

A three-armed lever 21, 23, 27 is rotatably mounted on the same shaft 4 as the toothed segment 5 for pivoting relative thereto. A draw spring 22 has one end connected to the arm 21 of the three-armed lever 21, 23, 27 and its other end anchored to one of the spacer elements 3 extending between the plates 1 and 2. The lever arm 23 is provided at its free end with a pin 24 extending in parallel with the pivot shaft 4 through an arcuate slot 25 in the toothed segment 5 and through a corresponding slot 26 provided in the plate 2. Between a point of the toothed segment 5 and the third lever arm 27 there is connected a draw spring 28 under the urging of which the toothed segment 5 is maintained in the angular position relative to the lever illustrated in FIGURE 1, in which position one end of the arcuate slot 25 abuts the pin 24 projecting from the lever arm 23. The toothed segment 5 is rotatable from this position against the action of the spring 28 in clockwise direction according to FIGURE 1 relative to the lever arm 23 an angular distance which is limited by the opposite end of the slot 25 abutting the pin 24. The lever 21, 23, 27 is rotatable in counter-clockwise direction according to FIGURE 1 against the action of the spring 22 from the position shown in FIGURE 1, in which the pin 24 lies against one end of the arcuate slot 26 in the plate 2, to a position not shown in the drawings, wherein the pin 24 abuts the opposite end of the slot 26.

When the lever 21, 23, 27 is swung from the position shown in FIGURE 1 to the position determined by the abutment of the pin 24 against the lower end of the slot 26 according to FIGURE 1, the spring 22 is stretched and the toothed segment 5 is urged along by the spring 28 in the movement of the lever, so that the shaft 10 is rotated by the toothed sement 5 by the action of gear wheels 7, 8 and 9. When the lever 23 is released from said position, it is returned by the spring 22 towards the position shown in FIGURE 1, whereat the pin 24 projecting from the lever arm 23 serves as a coupling pin and moves the toothed segment 5 together with the lever 23, so that the shaft 10 will be rotated in a direction opposite to the first-mentioned direction by the segment 5 by action of gear wheels 7, 8 and 9.

The disc magnets 15 and 16 are made with magnetic poles on the side facing the metal disc 20. By turning the disc magnet 16 by pushing the arm 19 projecting from ring 17 the poles of the disc magnet 16 may be adjusted to various positions relative to the poles of the disc magnet 15, so that the orientation of the magnetic flux passing through the aluminum disc 20 may be varied. Upon such rotation of the disc 20 the magnetic field generates eddy currents in the disc 20 in a manner known per se, and these eddy currents result in a braking force on the disc 20 the magnitude of which force is depending on the magnitude of the magnetic field.

The lever arm 27 is intended to be connected to the setting means and shutter mechanism of the camera (not shown) in such a manner that, upon setting of the shutter, the level arm 27 is swung from the position shown in FIGURE 1 to the opposite end position, rotating the toothed segment 5 along in the movement. The lever arm 27 and the segment 5 are maintained in said position until the camera shutter is released for exposure, whereupon the lever arm 27 is released and swings back towards the end position shown in FIGURE 1, thereby bringing along the toothed segment 5 which then as described above causes the eddy current generating disc 20 to rotate rapidly. The magnitude of the eddy current braking effect which affects the return time for the lever to the position shown in FIGURE 1 is determined by the angular position of the adjustable positioned disc magnet 16 relative to the fixed disc magnet 15.

This angular position is adjusted by means of the arm 19 extending from ring 17 which is intended to be connected to the exposure time setting means of the camera (not shown). When the lever arm 27 reaches the position shown in FIGURE 1 it will effect the closing of the camera shutter. A gentle gradual stopping of the rotating parts after the pin 24 has abutted the end of the slot 26 is made possible by the slot 25 provided in the toothed segment 5 and having the pin 24 extending therethrough. The slot 25 permits continued movement of the toothed segment 5 after the lever arm 27 has reached its end position. The movement of the toothed segment 5 and the parts driven thereby is then braked by the draw spring 28 secured between the toothed segment and the lever arm 27. After the movement has stopped the spring 28 returns the toothed segment to its initial position.

The invention is not limited to the particular embodiment hereinbefore described and as shown in the drawings as an example only, said embodiment being susceptible of various modifications with respect to its details without departing from the scope of the appended claims.

What I claim is:

1. In a time delay mechanism for operating camera shutters, a mounting frame, an actuating shutter arm member, a first shaft mounted in said mounting frame and whereon said shutter arm member is rotatably mounted, a toothed segment rotatably mounted on said first shaft and provided with an internal arcuate slot, said shutter arm member being provided with a pin extending parallel to said first shaft and engageable in said slot, a second shaft, a first gear wheel of relatively small diameter fixedly mounted on said second shaft to mesh with the teeth on said toothed segment, a second gear wheel of relatively large diameter fixedly mounted on said second shaft, a third shaft rotatably mounted in said mounting frame, a third gear wheel fixedly mounted on said third shaft and meshing with said second gear wheel, a first disc permanent magnet surrounding said third shaft, and fixedly mounted in said moving frame, a second disc permanent magnet, a retaining ring in which said second disc permanent magnet is fixedly mounted, a position setting pin extending from said ring, said disc permanent magnets having poles of determined position, said second disc permanent magnet being angularly adjustably mounted in said mounting frame coaxially with said first disc permanent magnet, and adjustably with reference to said first disc permanent magnet, whereby said permanent magnets can be adjusted so as to vary the existing magnetic field which is the resultant of the reaction of the individual magnetic fields on each other, and a non-magnetic metal eddy current disc mounted fixedly on said third shaft between said first and second disc permanent magnets and within the magnetic field existing between said first and second disc permanent magnets, and resilient means for normally maintaining said shutter arm member in an initial position.

2. In a delay mechanism for camera shutters, a rotatably journalled delay means, an adjustable spring driver means for positioning said delay means, two disc permanent magnets mounted parallel to each other in spaced relation, and being mounted coaxially angularly adjustable with reference to each other, a metal eddy current disc mounted on said driver means coaxially with said disc magnets and therebetween, said magnets having poles whereby the adjustment of the positions of said magnets varies the resultant magnetic field acting on said eddy current disc which is the resultant of the combination of the individual magnetic fields of said two permanent disc magnets as their relative position is varied.

References Cited

UNITED STATES PATENTS

| | | | |
|---|---|---|---|
| 2,909,683 | 10/1959 | Holzer | 310—93 |
| 3,068,372 | 12/1962 | Bell | 310—93 |
| 3,173,067 | 3/1965 | Wright | 317—167 |

FRED C. MATTERN, Jr., *Primary Examiner.*

F. D. SHOEMAKER, *Assistant Examiner.*

U.S. Cl. X.R.

95—53.3; 310—105; 335—301